United States Patent
Carl et al.

(10) Patent No.: US 11,328,146 B2
(45) Date of Patent: May 10, 2022

(54) SYSTEMS AND METHODS FOR PHYSICAL CABLE ROUTE TRACING

(71) Applicant: CommScope Technologies LLC, Hickory, NC (US)

(72) Inventors: LeaAnn Harrison Carl, Plano, TX (US); Ryan E. Enge, Carrollton, TX (US); Morgan C. Kurk, Denver, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/232,437

(22) Filed: Apr. 16, 2021

(65) Prior Publication Data

US 2022/0036023 A1 Feb. 3, 2022

Related U.S. Application Data (60) Provisional application No. 63/057,634, filed on Jul. 28, 2020.

(51) Int. Cl.
| | |
|---|---|
| *G06K 7/14* | (2006.01) |
| *G02B 6/44* | (2006.01) |
| *H01B 7/36* | (2006.01) |
| *H01B 7/17* | (2006.01) |
| *G06K 7/10* | (2006.01) |
| *G06K 19/06* | (2006.01) |
| *G06K 7/12* | (2006.01) |

(52) U.S. Cl.
CPC .......... *G06K 7/1417* (2013.01); *G02B 6/447* (2013.01); *G06K 7/10722* (2013.01); *G06K 7/12* (2013.01); *G06K 7/1413* (2013.01); *G06K 19/0614* (2013.01); *G06K 19/06028* (2013.01); *G06K 19/06037* (2013.01); *H01B 7/17* (2013.01); *H01B 7/36* (2013.01)

(58) Field of Classification Search
CPC .... G06K 7/1417; G06K 7/10722; G06K 7/12; G06K 7/1413; G06K 19/06028; G06K 19/06037; G06K 19/0614; G02B 6/447; H01B 7/17; H01B 7/36
See application file for complete search history.

(56) References Cited

U.S. PATENT DOCUMENTS

| | | |
|---|---|---|
| 6,596,943 B1 | 7/2003 | Ward |
| 8,620,123 B2 | 12/2013 | Dean, Jr. et al. |
| 9,563,798 B1 * | 2/2017 | Laser ................... G06K 7/1404 |
| 9,924,241 B2 | 3/2018 | Shih |
| 2004/0160744 A1 | 8/2004 | Yuan et al. |
| 2021/0279437 A1 * | 9/2021 | Marley ................ G06K 7/1413 |

FOREIGN PATENT DOCUMENTS

EP 1691225 A1 * 8/2006 ............. G02B 6/447

* cited by examiner

*Primary Examiner* — Laura A Gudorf
(74) *Attorney, Agent, or Firm* — Fogg & Powers LLC (57) ABSTRACT

Systems and methods for physical cable route tracing are provided. In one embodiment, a cable comprises: one or more of either electrical conductors or optical fibers; a cable sheath around the one or more of either electrical conductors or optical fibers; and a pattern of cable tracing facilitation markings located on an exterior of the cable sheath; wherein the cable tracing facilitation markings comprise either: a visually varying pattern that gradually changes along a length of the cable sheath; or a series of coded markings of an ordered sequence pattern.

19 Claims, 7 Drawing Sheets

SYSTEMS AND METHODS FOR PHYSICAL CABLE ROUTE TRACING

This application is a U.S. patent application claiming priority to, and the benefit of, U.S. Provisional Patent Application No. 63/057,634 titled "SYSTEMS AND METHODS FOR PHYSICAL CABLE ROUTE TRACING" filed on Jul. 28, 2020, which is incorporated herein by reference in its entirety.

BACKGROUND

Networks in central offices, data centers, and other network facilities are trending towards implementing ultra-dense, fiber rich network architectures. One example of this trend, from data centers, is the hyperscale model, where computing is performed in a distributed environment in which the volume of data and the demand for certain types of workloads can increase exponentially yet still be accommodated quickly in a cost-effective manner. In such networking facilities the need can arise for service technicians to physically follow the length of a cable from one point in the facility to another. However, in very dense network installations, performing such physical cable traces can become very difficult because the cable that needs to be traced may be routed with many other cables in bundles and run through raceways, cable trays, cable vaults and cabinets, with the cables sharing similar appearances. These bundles can become heavy, large and dense. In some locations along a cable route that offer limited physical access, only a segment of the cable may be available for visual inspection.

SUMMARY

The embodiments of the present disclosure provide methods and systems for physical cable route tracing and will be understood by reading and studying the following specification.

In one embodiment, a cable comprises: one or more of either electrical conductors or optical fibers; a cable sheath around the one or more of either electrical conductors or optical fibers; and a pattern of cable tracing facilitation markings located on an exterior of the cable sheath; wherein the cable tracing facilitation markings comprise either: a visually varying pattern that gradually changes along a length of the cable sheath; or a series of coded markings of an ordered sequence pattern.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure provide system and methods for determining cable installation routes that utilize a unique cable tracing facilitation markings patterned onto the cable that aid a service technician in distinguishing one cable from other cables routed in a bundle with that cable, such as in a same raceway or cable tray for example. In some embodiments, the unique cable tracing facilitation markings patterned onto the cable are located on the sheathing of the cable. As discussed below, the cable tracing facilitation markings can comprise any form or striping, graphical pattern, coloring, gradient markings, symbology, or other forms of coding, configured to create a unique pattern that can be directly correlated to a specific cable. A service technician that needs to perform the task of tracing such a cable can utilize the cable tracing facilitation markings to ensure that they are consistently tracing a specific cable of interest without being inadvertently sidetracked to a different cable. In some embodiments, the cable tracing facilitation markings are imprinted using an ink or other pigment that remain invisible to the human eye until illuminated with, for example, ultraviolet light. In such embodiments, the service technician may operate a specialized lighting device that illuminates the cable tracing facilitation markings to make them visible while performing a cable trace.

Figure 1:
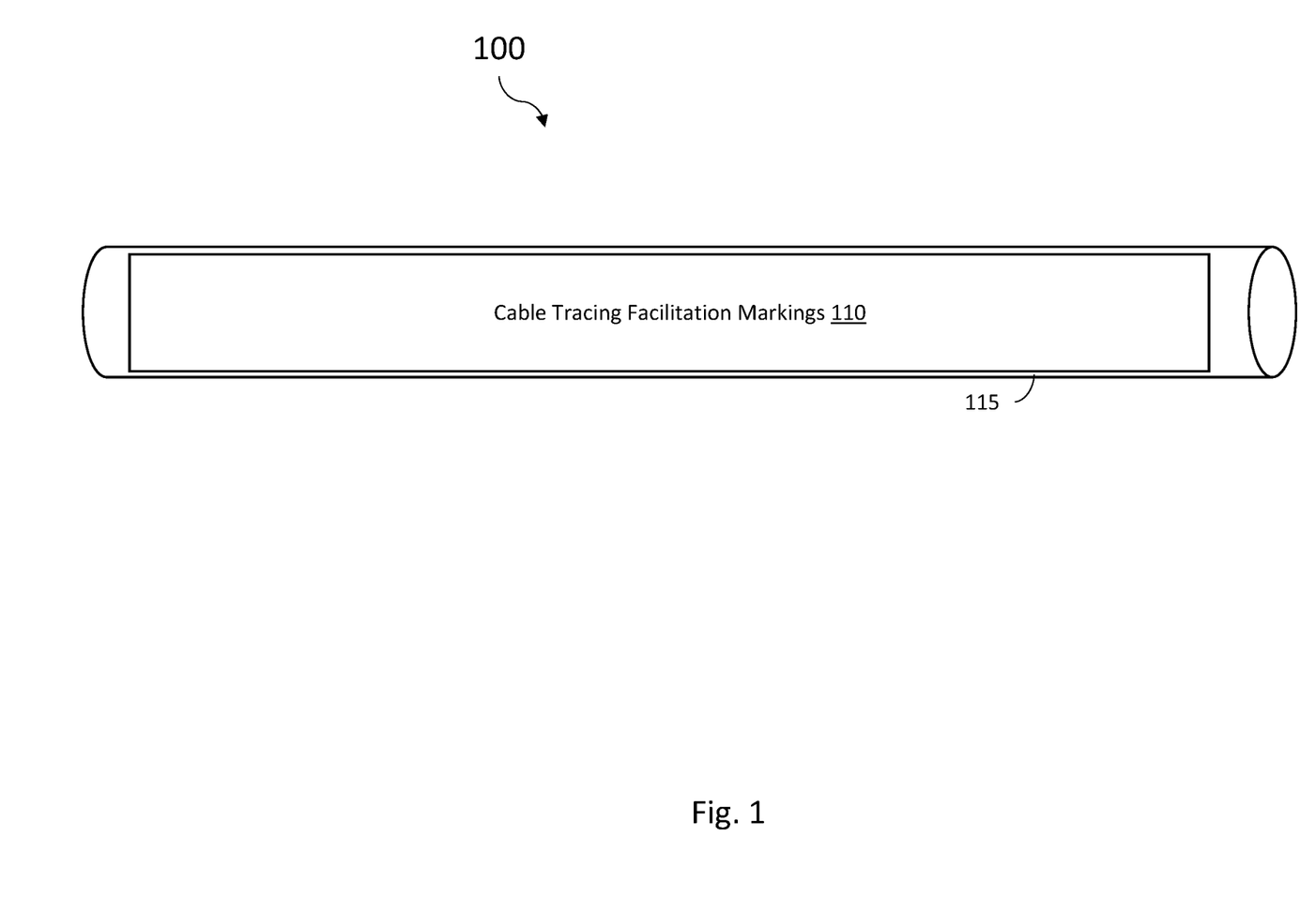
FIG. 1 is a diagram illustrating an example embodiment of a cable with cable tracing facilitation markings.

FIG. 1 is an illustration of an example embodiment of a cable 100 comprising a pattern of cable tracing facilitation markings 110 located on the exterior of a cable sheath 115 of the cable 100. In various alternative embodiments, the cable tracing facilitation markings 110 may comprise a unique continuous pattern, or a pattern of sequential markings. In various different embodiments, the cable 100 may comprise a network data cable that includes one or more electrical conductors, one or more optical fibers, or a combination of electrical conductors and optical fibers. In some embodiments, the cable 100 may comprise one or more electrical conductors for transporting electrical power instead of, or together with, communications data. In still other embodiments, cable 100 may comprise a hybrid power-data cable that transports both electrical power and data signals.

In one embodiment, the cable tracing facilitation markings 110 appearing on a cable 100 uniquely to that cable 100 and can be exclusively correlated to a specific instance of cable 100. In some embodiments, cable tracing facilitation markings 110 may comprise a varying pattern along the length of the cable 100 so that there is a unique pattern sequence for any given length of the cable. In such an implementation, when a cable 100 routed in bundle with other cables needs to be physically traced, it can be visually distinguished by the service technician from the other cables in the bundle by the cable tracing facilitation markings 110. For example, the cable tracing facilitation markings 110 may comprise a cable identifier encoded into a pattern that has a substantially large number of potential variations. In other embodiments, the cable tracing facilitation markings 110 may comprise a series of markings, where each individual marking in the series may not be unique, but the individual markings are arranged in a unique sequence.

Figure 2A:
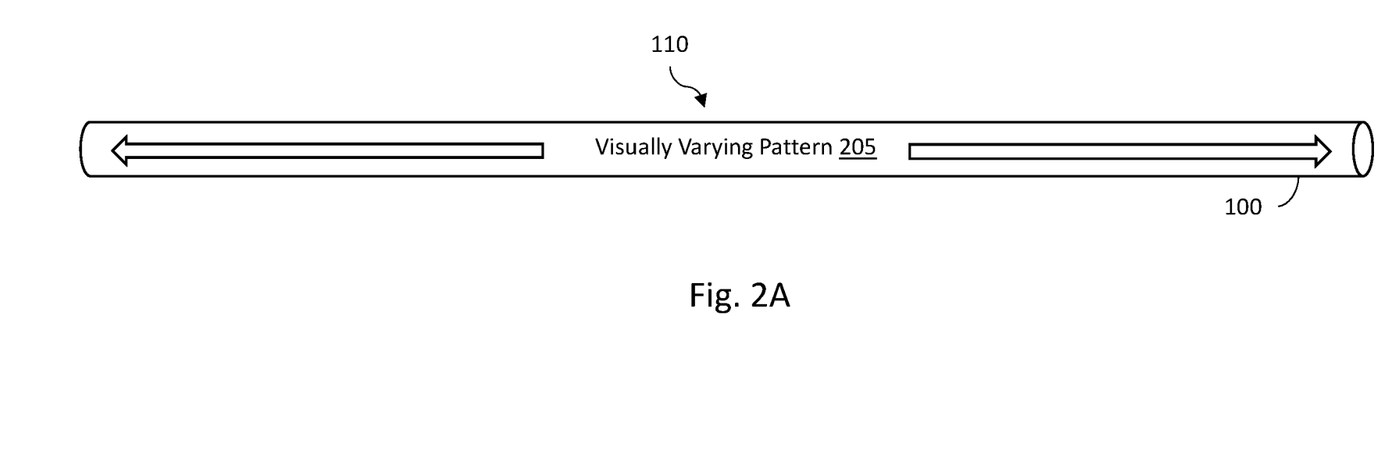
FIG. 2A is a diagram illustrating an example embodiment of a cable with cable tracing facilitation markings that comprise a visually varying pattern.

In some embodiments, such as shown in FIG. 2A, the cable tracing facilitation markings 110 may comprise a visually varying pattern 205 along the length of the cable 100. That is, the visually varying pattern 205 gradually changes along the length of the cable and comprises a graphical arrangement such that if a longer length of cable 100 were cut and divided into shorter lengths, and the resulting shorter lengths of cable laid side-by-side, the cable tracing facilitation markings 110 appearing on each may appear similar, but would be distinguishable. Visually varying pattern 205 may comprise a repeating decay pattern along the length of the cable 100. If separate lengths cut from the same cable 100 with the repeating decay pattern were used in a common raceway, the likelihood that their patterns are perfectly aligned would be negligible so that the service technician can still differentiate between them along the cable route. Other examples of marking 110 include, but are not limited to, colored stripes or a patterned sequence of stripes of varying patterns and/or colors, patterns separated by an initial distance where that distance changes (e.g. decreases or increases) by a measured amount along a length of the cable 100. In some embodiments, the cable tracing facilitation markings 110 may go around the circumference of the cable 100 so that it can be observed and decoded from any side of cable, avoiding the need to physically rotate or manipulate the cable.

Other cable tracing facilitation markings 110 may be patterned such that different segments of the same cable can be distinguished from each other, but still identified as part of the same cable. In operation, the service technician may follow the unique cable tracing facilitation markings 110, either by hand-over-hand tracing, or visually, in order to trace the cable 100 from one end to the other. Should the cable 100 become tangled with other cables in a congested cable bundle, the unique cable tracing facilitation markings 110 may be utilized to distinguish the cable being traces from other cables in the congested cable bundle.

Figure 2B:
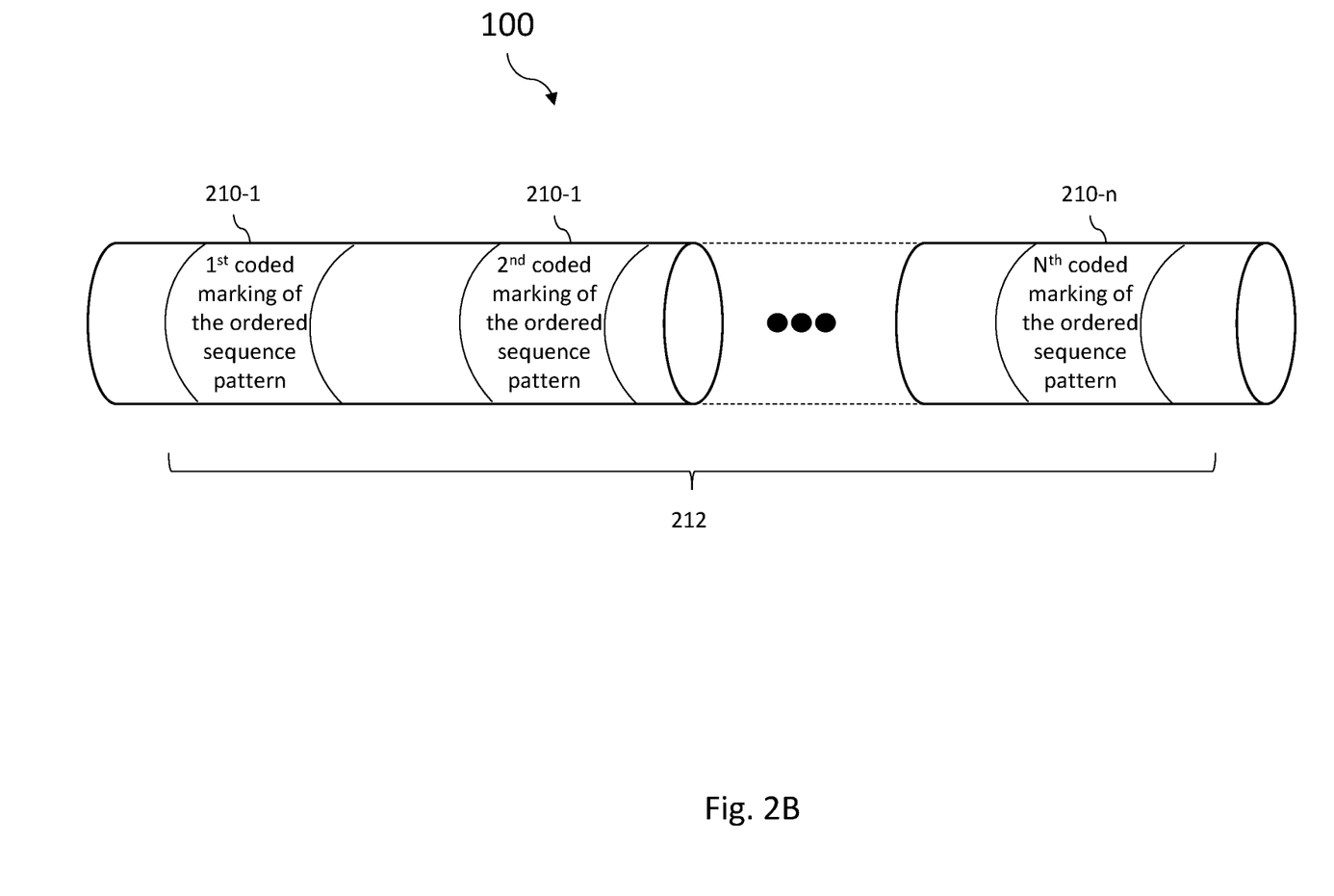
FIG. 2B is a diagram illustrating an example embodiment of a cable with cable tracing facilitation markings that comprise coded markings of an ordered sequence pattern.

In some embodiments, the cable tracing facilitation markings 110 may comprise a series of coded markings in an ordered sequence pattern, as illustrated in FIG. 2B. In the embodiment of FIG. 2B, the cable 100 has cable tracing facilitation markings 110 that comprises a plurality of coded markings 210 (shown as 210-1 to 210-n in FIG. 2) that are part of an ordered sequence pattern 212 across the length of the cable 100. In some embodiment, each of the coded markings 210 of the ordered sequence pattern 212 correlate to a subset of a long ordered sequence. In such an embodiment, the coded markings 210 appearing at the terminal ends of a length of the cable 100 would define a closed pattern set or range such that no coded marking 210 within that range would appear within the range of any other cable. For example, the coded markings 210 may correlated to a running numeric sequence that increases as the cable is manufactured. For example, a coded marking 210 for a running numeric sequence may be printed on the cable at a predefined distance (e.g., a foot or meter) from neighboring markings 210. Such sequence may be encoded into the cable tracing facilitation markings 110 as a graphical pattern rather than by printed numbers. In some embodiments, other information may be encoded into the cable tracing facilitation markings 110 along with the coded marking 210. For example, in some embodiments, coded marking 210 may include encoded information such as the distance to the next coded marking 210 in either direction of the cable 100, or other cable related information.

In some network facilities, it may not be desirable for the cable tracing facilitation markings 110 to be visible on a cable 100 except under circumstances where a service technician is actively performing a cable tracing task. For example, for the purpose of everyday network operating tasks and work orders, service technicians may rely on other cable tags, cable colors or markings to identify cable connectors that need to be added, removed, or moved. In some embodiments, the cable tracing facilitation markings 110 may comprise fluorescence or other form of an ink or other pigment that remain invisible to the human eye until illuminated with light within of a specific range of wavelength or band, such as ultraviolet light for example. In such embodiments, the service technician may operate a specialized illuminating device (for example, a blacklight or ultraviolet flashlight) that illuminates the cable tracing facilitation markings 110 to make them visible while performing a cable trace.

As mentioned above, coded marking 210 and other cable tracing facilitation markings 110 may comprise information included in their patterns. For example, the coded marking 210 of an encode ordered sequence pattern 212 may comprise a bar code, Data Matrix code, Quick Response (QR) code, High Capacity Color Barcode (HCCB), or other standardized or proprietary geometric coding scheme that can effectively be used to produce unique markings.

Figure 3:
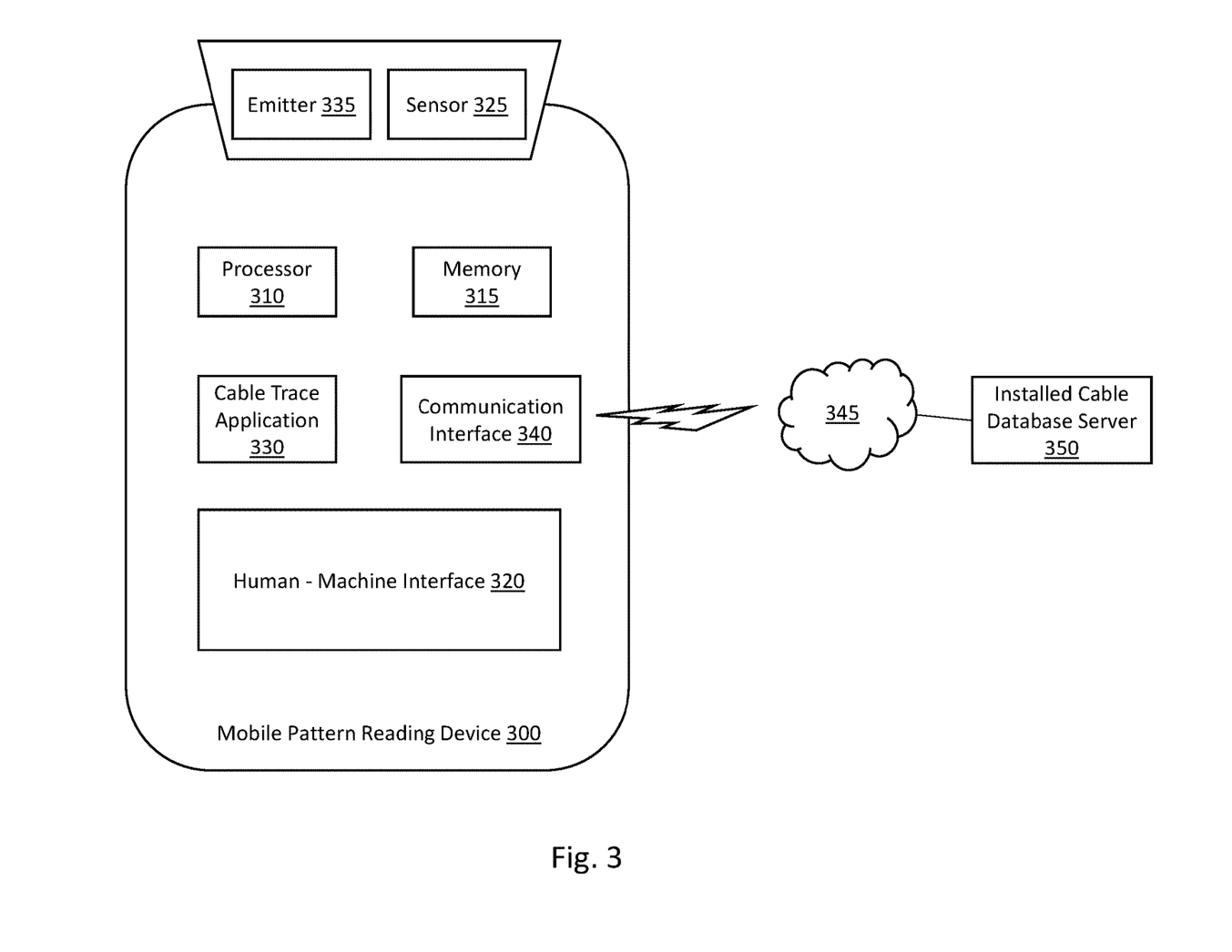
FIG. 3 is a diagram illustrating an example mobile pattern reading device for use with cable with cable tracing facilitation markings.

It should be appreciated that as the encoding patterns used to implement coded markings 210 and other cable tracing facilitation markings 110 become more complex, the changes and variations in the patterns along the cable for distinguishing one coded marking 210 from the next may become too nuanced for a human service technician to visually discern without electronic assistance. Accordingly, a further embodiment of the present disclosure includes a mobile pattern reading device 300 as illustrated in FIG. 3. As shown in FIG. 3, in one embodiment, a mobile pattern reading device 300 comprises a processor 310 coupled to a memory 315, a human-machine interface 320, and at least one image sensor 325. The processor 310 is programed to execute at least one cable trace application 330 in order to implement the functions of the mobile pattern reading device 300 described herein.

In some embodiments, the mobile pattern reading device 300 may be implemented using a smart phone, tablet computer, or a wearable computing device. In some embodiments, the human-machine interface 320 may comprise a display used to output information from the cable trace application 330 to the service technician. In some embodiments, the human-machine interface 320 may comprise a touch-screen display interface which may be operated by the service technician to select and initiate functions of the cable trace application 330. The image sensor 325 may comprise an optical sensor, such as a camera. In alternate implementations, the image sensor 325 may comprise any form of optical sensor responsive to light in the visual spectrums, UV spectrum, IR spectrum, or some combination thereof. In other embodiments, other sensors may be used.

In operation, the cable trace application 330 controls the image sensor 325 to obtain an image of the cable tracing facilitation markings 110. Application 330 decodes the image of the cable markings 110, and based on the decoded markings, provides an indication to the service technician via the human-machine interface 320 whether the scanned and decoded markings 110 are from the particular cable 100 the service technician is attempting to trace. In some embodiments, the a mobile pattern reading device 300 further includes at least one light emitting device 335, and the cable trace application 330 controls the light emitting device 335 to coordinate illumination of the cable tracing facilitation markings 110 while the image sensor 325 obtains an image. In some embodiments, where the cable tracing facilitation markings 110 comprises fluorescence or other form of ink or other pigment that remain invisible to the human eye until illuminated with light within of a specific range of wavelength or band, the light emitting device 335 outputs a light of such wavelength that makes the cable tracing facilitation markings 110 visible, at least to the image sensor 325, or in some embodiments, visible to the image sensor 325 and the service technician. In some embodiments, the mobile pattern reading device 300 may further comprise a communication interface 340 for communicating with a cable database server 350 or other data service via a network 345. Communication interface 340 may be either a wired communication interface, or a wireless communication interface. Network 345 may comprise any public or private network, including but not limited to the Internet. Moreover, network 345 may comprise a wireless network, a wired network, or a mixed network comprising interconnected wired and wireless segments. In some embodiments, the cable trace application 330 may access the cable database server 350 or other data service to determine how the cable tracing facilitation markings 110 is to be decoded, or to further obtain additional information about the cable 100 based on information decoded from the cable tracing facilitation markings 110. Information about the cable pertinent to tracing (whether decoded from the cable tracing facilitation markings 110 and/or obtained from the cable database server 350) may include one or both of cable length or a range of expected values that correlate to the cable tracing facilitation markings 110. Additional information about the cable may include any of cable type, endpoint information, circuit information, or customer notes.

Figure 4:
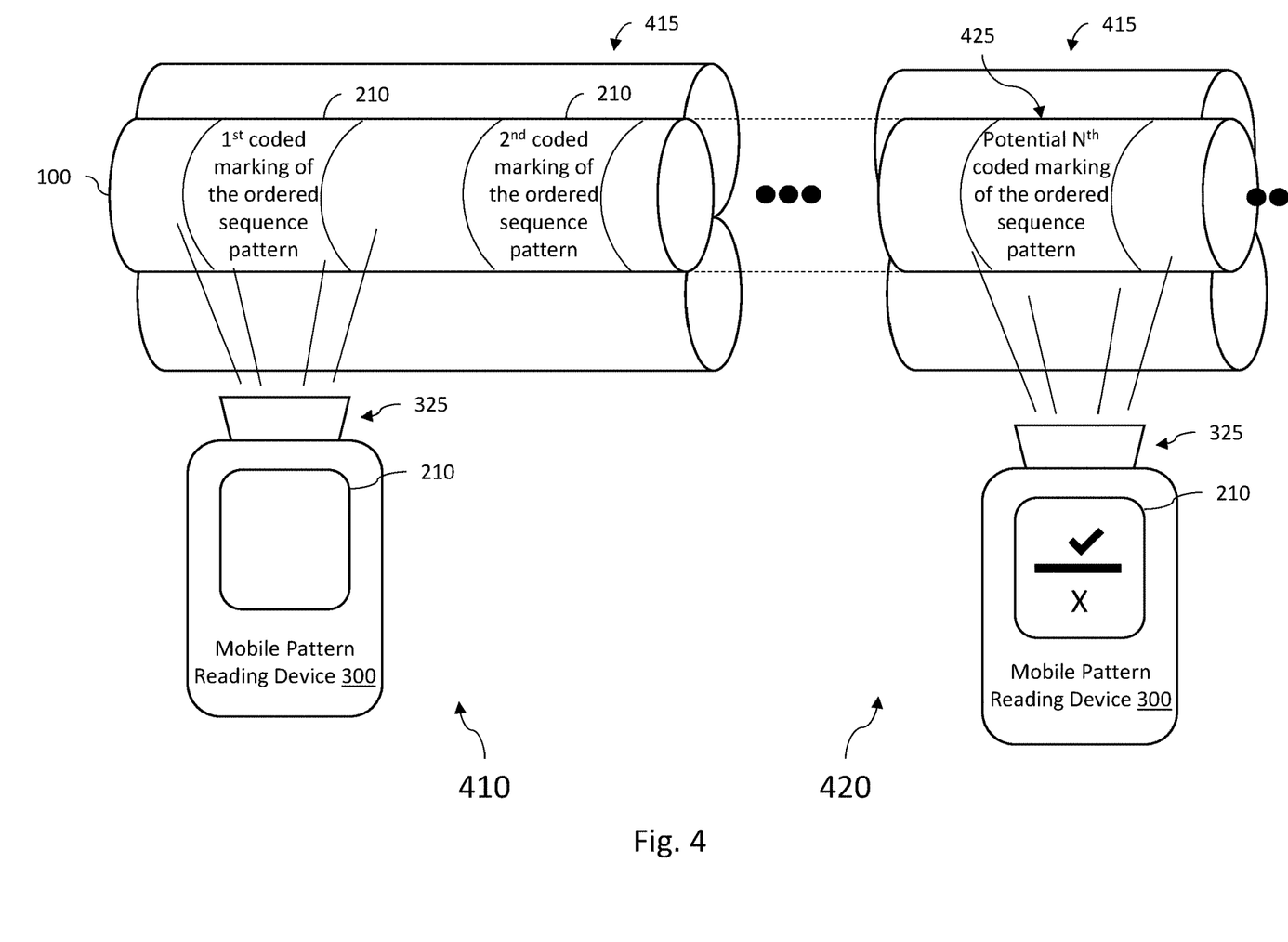
FIG. 4 is a diagram illustrating an example mobile pattern reading device in use a with cable with cable tracing facilitation markings.

FIG. 4 provides an example embodiment of utilizing the mobile pattern reading device 300 in conjunction with a cable 100 that comprises a plurality of coded markings 210 of an ordered sequence pattern 212. As shown at 410, in this example embodiment, the image sensor 325 is aimed at a first of the coded markings 210 on a cable 100 that may be routed as part of a bundle with other cables (shown at 415). The cable trace application 330 obtains an image of the $1^{st}$ coded marking 210 and decodes it to establish a base sequence reading. The service technician may then relocate the mobile pattern reading device 300, as shown at 420, to another length of the cable bundle 415 and aim the image sensor 325 at a candidate coded marking 425 that the service technician believes may be another coded marking 210 of the cable 100. The cable trace application 330 obtains an image of the candidate coded marking 425 and decodes the candidate coded marking 425 to determine if it falls within a predetermined sequence range from the base sequence reading. If so, then the cable trace application 330 displays onto the human-machine interface 320 a positive indication, to inform the service technician that the cable with the candidate coded marking 425 is in fact part of the cable 100 they are tracing. In some embodiments, the decoded sequence reading obtained from a verified candidate coded marking 425 may be used as the base sequence reading for a next iteration of the cable tracing task. If the candidate coded marking 425 does not falls within a predetermined sequence range from the base sequence reading, then a negative indication is displayed by the cable trace application 330 displays onto the human-machine interface 320 and the service technician may be prompted to try a different cable.

It should be appreciated that the predetermined sequence range is determinable multiple ways. In some embodiments, the predetermined sequence range is entered by a customer during cable installation and stored in cable database server 350. This information may be entered manually, or the information entered semi-automated, facilitated by the cable trace application 330 that reads and stores the codes. Once recorded to the cable database server 350, the predetermined sequence range can be read over a network 345 by the cable trace application 330.

In some embodiments, the predetermined sequence range is determined based on a cable length, a sequence direction and a coded marking's value as read from one end of the cable 100. The cable length is obtainable from the cable database server 350. As mentioned, this information may be entered and stored in the database, or alternately from other ways such as, but not limited to, determined from a site floorplan by software, factory-determined for pre-terminated cables, or measured by a handheld tester. The sequence direction may be deterministic based on some combination of information such as: the orientation of the cable tracing facilitation markings to or from the nearest cable endpoint, the inclusion of orientation markers on the cable (such as, but not limited to arrows, pattern alignment features, other shapes), the physical location of a first end of the cable 100 (for example, as determined by indoor positioning technologies, global navigation satellite systems (such as the Global Positioning System (GPS), or Galileo, if available), or user selection of a location on a displayed on a displayed floorplan) combined with stored knowledge about the cable pull direction when the cable was pulled. In some embodiments, consistency in factory production of marked cables 100 might be good enough to correlate numeric sequence values to cable lengths, but the intervals between markings may also be encoded into the markings 110.

In some embodiments, the predetermined sequence range used to judge the candidate coded marking 425 may be defined in terms of a set number of coded markings 210 away from the first coded marking 210 read at 410. For example, the predetermined sequence range may be set (either by default or by the technician) to any number, N. Then if the decoded candidate coded marking 425 is within N coded markings 210 of the first coded marking 210 read at 410, the cable trace application 330 displays onto the human-machine interface 320 the positive indication, and displays onto the human-machine interface 320 the negative indication if not.

In one alternate implementation, the service technician may obtain first and second base sequence readings by first reading a first coded marking 210 at or near a first end of the cable 100, and then reading a second coded marking 210 at or near a second end of the cable 100, and utilize these two base sequence readings to define the predetermined sequence range. In another alternate implementation, when the service technician obtains the first sequence reading from the first coded marking 210, it may instead utilize information decoded from the first coded marking 210 and communication interface 340 to obtain the predetermined sequence range from cable database server 350 or other data service via network 345. In either of these cases, the service technician may then relocate the mobile pattern reading device 300 to the candidate coded marking 425 (as shown at 420). The cable trace application 330 obtains an image of the candidate coded marking 425 and decodes the candidate coded marking 425 to determine if it falls within the predetermined sequence range. Positive and negative indication are displayed by the cable trace application 330 onto the onto the human-machine interface 320.

Figure 4A:
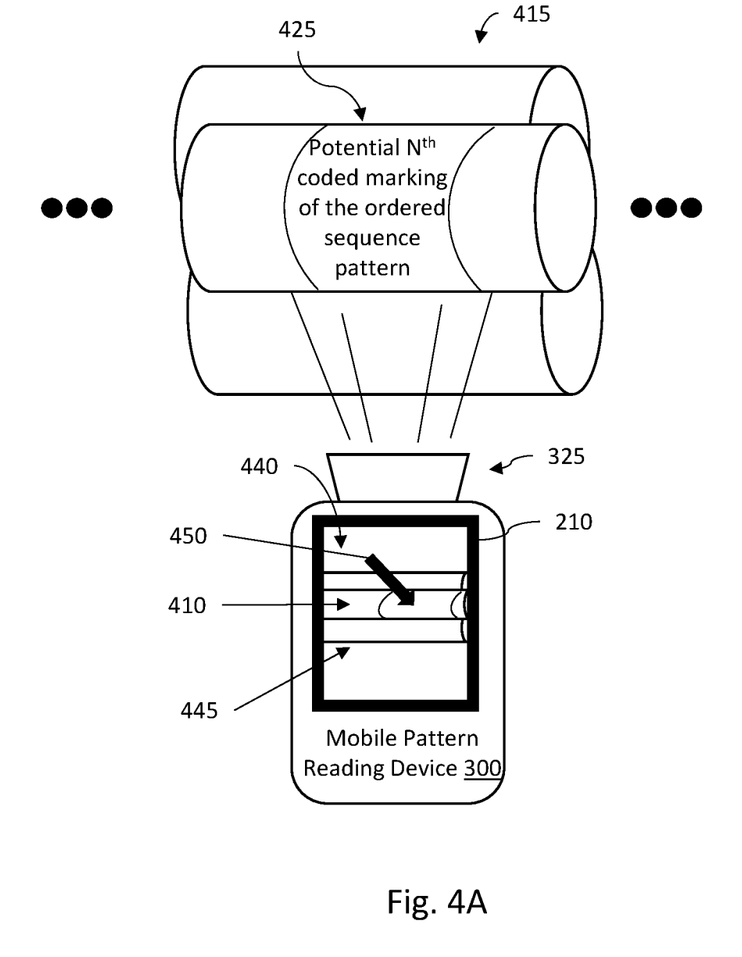
FIG. 4A is a diagram illustrating an example mobile pattern reading device displaying an augmented reality display in use a with cable with cable tracing facilitation markings.

In some embodiments, the positive and negative indications displayed on the human-machine interface 320 may simply display icons, symbols, colors, or word to indicate if a candidate coded marking 425 is indeed part of the cable 100 being traced. In other embodiments, as shown in FIG. 4A the cable trace application 330 may present an augmented reality display 440 on the human-machine interface 320 to the service technician. For example, once the image sensor 325 is activated by the cable trace application 330 to read a coded marking 210 (such as the candidate coded marking 425) it also captures an image 410 of the cable 100 from which the coded marking 210 was read. The image may also include the cable bundle 415 immediately proximate to the cable 100. The cable trace application 330 may then display that image of the bundle 445 on the human-machine interface 320 and provide a positive indication by also displaying a digital overlay of information, such as an icon 450 visually pointing to the cable 100 that has the candidate coded marking 425 verified as within the predetermined sequence range. Other information about the cable optionally may also be included in the overlay.

Figure 5:
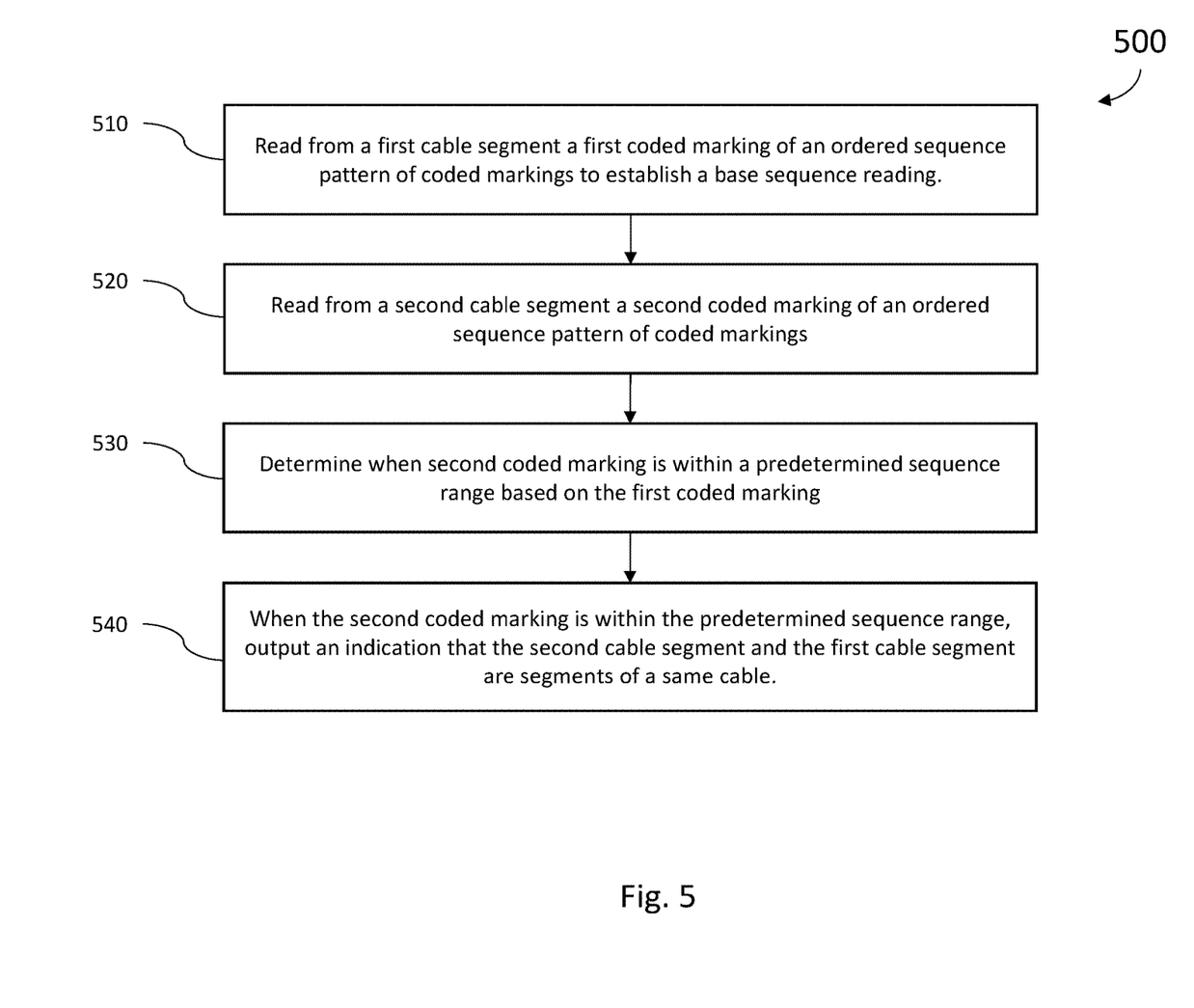
FIG. 5 is an example embodiment of a method for cable tracing a cable with cable tracing facilitation markings.

FIG. 5 illustrates a method 500 of one embodiment of the present disclosure. It should be understood that the features and elements described herein with respect to the method shown in FIG. 5 and the accompanying description may be used in conjunction with, in combination with, or substituted for elements of any of the other embodiments discussed herein, and vice versa. Further, it should be understood that the functions, structures and other description of elements associated with embodiments of FIG. 5 may apply to like named or described elements for any of the FIGS. 1-4A and embodiments described therein, and vice versa. It should also be understood that method 500 may be implemented by the mobile pattern reading device 300 discussed above in some embodiments. The method begins at 510 with reading from a first cable segment a first coded marking of an ordered sequence pattern of coded markings to establish a base sequence reading. The method proceeds to 520 with reading from a second cable segment a second coded marking of an ordered sequence pattern of coded markings. The method proceeds to 530 with determining whether or not the second coded marking is within a predetermined sequence range base on the first coded marking. As mentioned above, this determination may be deterministically informed by cable length data and/or value range data. In some embodiments, such data may be accessed and retrieved from a database such as from cable database server 350 or other data service via network 345. When the second coded marking is within the predetermined sequence range, the method proceeds to 540 with outputting an indication that the second cable segment and the first cable segment are segments of a same cable.

EXAMPLE EMBODIMENTS

Example 1 includes a cable, the cable comprising: one or more of either electrical conductors or optical fibers; a cable sheath around the one or more of either electrical conductors or optical fibers; a pattern of cable tracing facilitation markings located on an exterior of the cable sheath; wherein the cable tracing facilitation markings comprise either: a visually varying pattern that gradually changes along a length of the cable sheath; or a series of coded markings of an ordered sequence pattern.

Example 2 includes the cable of example 1, wherein the visually varying pattern comprises a repeating decay pattern along the length of the cable sheath.

Example 3 includes the cable of any of examples 1-2, wherein the visually varying pattern comprises a gradually changing graphical arrangement.

Example 4 includes the cable of any of examples 1-3, wherein the visually varying pattern comprises at least one of: a series of colored stripes; a patterned sequence of stripes of varying patterns or colors; or patterns separated by increasing distances along the length of the cable sheath Example 5 includes the cable of any of examples 1-4, wherein each of the coded markings of the ordered sequence pattern correlate to a subset of an ordered sequence.

Example 6 includes the cable of any of examples 1-5, wherein each of the coded markings of the ordered sequence pattern correlate to an encoded numeric sequence.

Example 7 includes the cable of any of examples 1-6, wherein each of the coded markings of the ordered sequence pattern encode information about the cable.

Example 8 includes the cable of any of examples 1-7, wherein the coded markings of the ordered sequence pattern comprise one of: a bar code; a Data Matrix code; a Quick Response (QR) code; a High Capacity Color Barcode (HCCB); or a standardized or proprietary geometric coding scheme.

Example 9 includes the cable of any of examples 1-8, wherein the cable tracing facilitation marking comprise fluorescent markings not visible to the human eye.

Example 10 includes a mobile pattern reading device for physical cable route tracing, the device comprising: a processor coupled to a memory and configured to execute a cable trace application; a human-machine interface; at least one image sensor; wherein the cable trace application is configured to control the image sensor to obtain a plurality of images of cable tracing facilitation markings, wherein the cable tracing facilitation markings comprise either: a visually varying pattern that gradually changes along a length of a cable sheath, or a series of coded markings of an ordered sequence pattern; wherein the cable trace application is configured to decode the plurality of images of the cable tracing facilitation markings and output an indication to the human-machine interface indicating whether a first image of the plurality of images and a second image of the plurality of images are from cable tracing facilitation markings of a same cable.

Example 11 includes the device of example 10, wherein the human-machine interface comprises a touch-screen display.

Example 12 includes the device of any of examples 10-11, wherein the image sensor comprises at least one of: an ultraviolet, infrared, or visual spectrum optical sensor.

Example 13 includes the device of any of examples 10-12, wherein the cable trace application is configured to obtain an image of a candidate coded marking and decode the candidate coded marking to determine if the candidate coded marking is within a predetermined sequence range based on a base sequence reading decoded by the cable trace application from a first coded marking of an ordered sequence pattern.

Example 14 includes the device of example 13, wherein when the candidate coded marking is within the predetermined sequence range, the cable trace application is configured to display to the human-machine interface a positive indication; and when the candidate coded marking is not within the predetermined sequence range, the cable trace application is configured to display to the human-machine interface a negative indication.

Example 15 includes the device of example 13, wherein when the candidate coded marking is within the predetermined sequence range, the cable trace application is configured to display an augmented reality image on the human-machine interface comprising a digital overlay visually pointing to an image of a cable that comprises the candidate coded marking.

Example 16 includes the device of any of examples 10-15, further comprising at least one light emitting device; wherein the cable trace application is configured to control the light emitting device to coordinate illumination of the cable tracing facilitation markings while the image sensor obtains the plurality of images.

Example 17 includes the device of any of examples 10-16, wherein the cable tracing facilitation marking comprise fluorescent markings not visible to the human eye and the light emitting device outputs a light comprising a wavelength that makes the cable tracing facilitation markings visible at least to the image sensor.

Example 18 includes the device of any of examples 10-17, further comprising a wired or wireless communication interface configured to communicate with a cable database server via a network; wherein the cable trace application is configured to access the cable database server to obtain information about the cable based on information decoded from the cable tracing facilitation markings.

Example 19 includes the device of any of examples 10-18, wherein the cable trace application is configured to decode the first image of the plurality of images of the cable tracing facilitation markings to determine a predetermined sequence range; wherein the cable trace application is configured to determine whether the first image of the plurality of images and the second image of the plurality of images are from cable tracing facilitation markings of a same cable based whether the second image of the plurality of images comprises a sequence reading within the predetermined sequence range.

Example 20 includes a method for physical cable route tracing, the method comprising: reading from a first cable segment a first coded marking of an ordered sequence pattern of coded markings to establish a base sequence reading; reading from a second cable segment a second coded marking of an ordered sequence pattern of coded markings; determining whether or not the second coded marking is within a predetermined sequence range base on the first coded marking; when the second coded marking is within the predetermined sequence range, outputting an indication that the second cable segment and the first cable segment are segments of a same cable; and when the second coded marking is not within the predetermined sequence range, not outputting an indication that the second cable segment and the first cable segment are segments of a same cable.

Example 21 includes the method of example 20, further comprising: when the second coded marking is within the predetermined sequence range, displaying to a human-machine interface a positive indication; and when the second coded marking is not within the predetermined sequence range, displaying to the human-machine interface a negative indication.

Example 22 includes the method of any of examples 20-21, further comprising determining the predetermined sequence range based on information decoded from the first coded marking.

Example 23 includes the method of any of examples 20-22, further comprising: accessing a cable database server via a network to obtain cable based on information decoded from the first coded marking or the second coded marking.

In various alternative embodiments, system and/or device elements, method steps, or example implementations described throughout this disclosure (such as any of the mobile pattern reading device, processor, human-machine-interface, wireless communication interface, database server, or sub-parts thereof, for example) may be implemented at least in part using one or more computer systems, field programmable gate arrays (FPGAs), or similar devices comprising a processor coupled to a memory and executing code to realize those elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

As used herein terms such as "cable", "mobile pattern reading device", "processor", "memory", "human-machine-interface", "wireless-communication interface", "network", "server", all refer to hardware components and/or circuitry that would be immediately recognized and understood by those of skill in the art as defining structure and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A cable, the cable comprising:
   one or more of either electrical conductors or optical fibers;
   a cable sheath around the one or more of either electrical conductors or optical fibers; and
   a pattern of cable tracing facilitation markings located on an exterior of the cable sheath;
   wherein the cable tracing facilitation markings comprise either:
   a visually varying pattern that gradually changes along a length of the cable sheath;

wherein the visually varying pattern comprises:
a repeating decay pattern along the length of the cable sheath;
a gradually changing graphical arrangement; or
at least one of:
a series of colored stripes;
a patterned sequence of stripes of varying patterns or colors; and
patterns separated by increasing distances along the length of the cable sheath.

2. The cable of claim 1, wherein the cable tracing facilitation markings further comprise a series of coded markings of an ordered sequence pattern.

3. The cable of claim 2, wherein each of the coded markings of the ordered sequence pattern correlate to a subset of an ordered sequence.

4. The cable of claim 2, wherein each of the coded markings of the ordered sequence pattern correlate to an encoded numeric sequence.

5. The cable of claim 2, wherein each of the coded markings of the ordered sequence pattern encode information about the cable.

6. The cable of claim 2, wherein the coded markings of the ordered sequence pattern comprise one of:
a bar code;
a Data Matrix code;
a Quick Response (QR) code;
a High Capacity Color Barcode (HCCB); or
a standardized or proprietary geometric coding scheme.

7. The cable of claim 1, wherein the cable tracing facilitation markings comprises fluorescent markings invisible to a human eye.

8. A mobile pattern reading device for physical cable route tracing, the device comprising:
a processor coupled to a memory and configured to execute a cable trace application;
a human-machine interface;
at least one image sensor; and
wherein the cable trace application is configured to control the at least one image sensor to obtain a plurality of images of cable tracing facilitation markings, wherein the cable tracing facilitation markings comprise either: a visually varying pattern that gradually changes along a length of a cable sheath, or a series of coded markings of an ordered sequence pattern;
wherein the cable trace application is configured to decode the plurality of images of the cable tracing facilitation markings and output an indication to the human-machine interface indicating whether a first image of the plurality of images and a second image of the plurality of images are from cable tracing facilitation markings of a same cable;
wherein the cable trace application is configured to obtain an image of a candidate coded marking and decode the candidate coded marking to determine if the candidate coded marking is within a predetermined sequence range based on a base sequence reading decoded by the cable trace application from a first coded marking of an ordered sequence pattern; and
wherein when the candidate coded marking is within the predetermined sequence range, the cable trace application is configured to display an augmented reality image on the human-machine interface comprising a digital overlay visually pointing to an image of a cable that comprises the candidate coded marking.

9. The device of claim 8, wherein the human-machine interface comprises a touch-screen display.

10. The device of claim 8, wherein the at least one image sensor comprises at least one of:
an ultraviolet, infrared, or visual spectrum optical sensor.

11. The device of claim 8, wherein when the candidate coded marking is within the predetermined sequence range, the cable trace application is configured to display to the human-machine interface a positive indication; and
when the candidate coded marking is not within the predetermined sequence range, the cable trace application is configured to display to the human-machine interface a negative indication.

12. The device of claim 8, further comprising at least one light emitting device;
wherein the cable trace application is configured to control the at least one light emitting device to coordinate illumination of the cable tracing facilitation markings while the at least one image sensor obtains the plurality of images.

13. The device of claim 12, wherein the cable tracing facilitation markings comprise fluorescent markings invisible to a human eye and the at least one light emitting device outputs a light comprising a wavelength that makes the cable tracing facilitation markings visible at least to the at least one image sensor.

14. The device of claim 8, further comprising a wireless communication interface configured to communicate with a cable database server via a network;
wherein the cable trace application is configured to access the cable database server to obtain information about the cable based on information decoded from the cable tracing facilitation markings.

15. The device of claim 8, wherein the cable trace application is configured to decode the first image of the plurality of images of the cable tracing facilitation markings to determine a predetermined sequence range;
wherein the cable trace application is configured to determine whether the first image of the plurality of images and the second image of the plurality of images are from cable tracing facilitation markings of a same cable based whether the second image of the plurality of images comprises a sequence reading within the predetermined sequence range.

16. A method for physical cable route tracing, the method comprising:
reading from a first cable segment a first coded marking of an ordered sequence pattern of coded markings to establish a base sequence reading;
reading from a second cable segment a second coded marking of an ordered sequence pattern of coded markings;
determining whether or not the second coded marking is within a predetermined sequence range base on the first coded marking;
when the second coded marking is within the predetermined sequence range base, outputting an indication that the second cable segment and the first cable segment are segments of a same cable by displaying an augmented reality image on a human-machine interface comprising a digital overlay visually pointing to an image of a cable that comprises the second coded marking; and
when the second coded marking is not within the predetermined sequence range base, not outputting an indication that the second cable segment and the first cable segment are segments of a same cable.

17. The method of claim 16, further comprising:
when the second coded marking is within the predetermined sequence range base, displaying to a human-machine interface a positive indication; and
when the second coded marking is not within the predetermined sequence range base, displaying to the human-machine interface a negative indication.

18. The method of claim 16, further comprising determining the predetermined sequence range based on information decoded from the first coded marking.

19. The method of claim 16, further comprising:
accessing a cable database server via a network to obtain cable based on information decoded from the first coded marking or the second coded marking.

\* \* \* \* \*